Dec. 23, 1969    TAKEO YAMADA    3,485,154
EXPOSURE MEASURING MECHANISM OF CAMERAS
Filed Dec. 1, 1966
FIG. 1
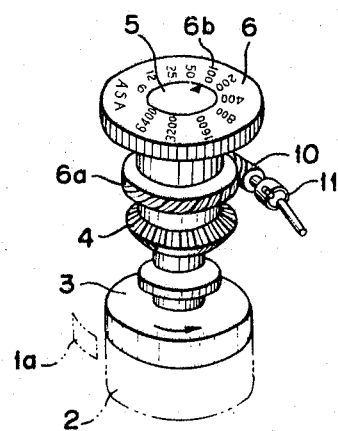
FIG. 2
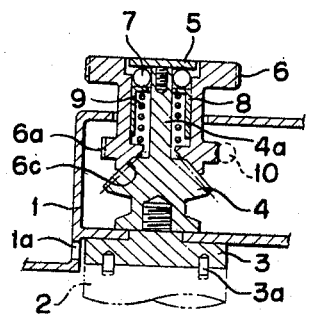
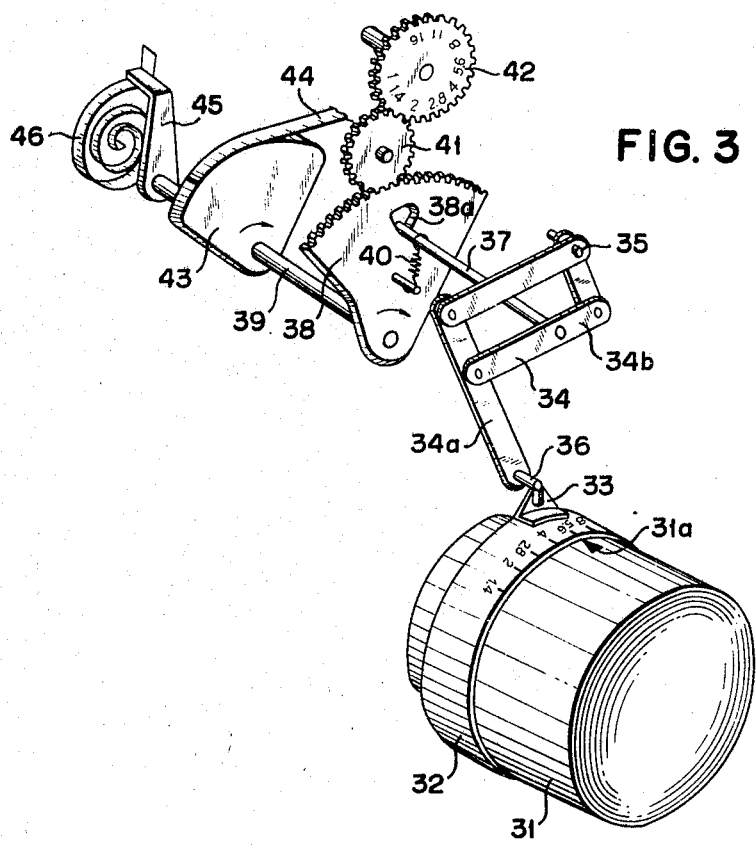
FIG. 3

United States Patent Office
3,485,154
Patented Dec. 23, 1969

3,485,154
EXPOSURE MEASURING MECHANISM OF CAMERAS
Takeo Yamada, Tokyo, Japan, assignor to Nippon Kogaku K.K., Tokyo, Japan, a corporation of Japan
Filed Dec. 1, 1966, Ser. No. 598,248
Claims priority, application Japan, Dec. 4, 1965, 40/74,260, 40/74,261, 40/98,485
Int. Cl. G01j 1/00; G03b 9/02, 19/00
U.S. Cl. 95—10
9 Claims

ABSTRACT OF THE DISCLOSURE

An exposure measuring mechanism is provided for a single lens reflex camera having interchangeable lenses in which the resistance value of a variable resistor forming a part of an exposure calculator is varied by shutter time and film speed settings and by aperture ratio settings. The calculator includes a maximum aperture ratio signal memory unit for memorizing the maximum aperture ratio of a lens, so that the subsquent stop settings introduced into the calculator are correctly measured as to light intensity. The stop rings of the interchangeable lenses are provided with stop signal members which are connected to the calculator by a pantagraph arrangement within the camera. The pantagraph connection to the calculator is such that a lens mounted on the camera without a stop signal member will nevertheless provide correct exposure measurements for such a lens.

---

Figure 4:
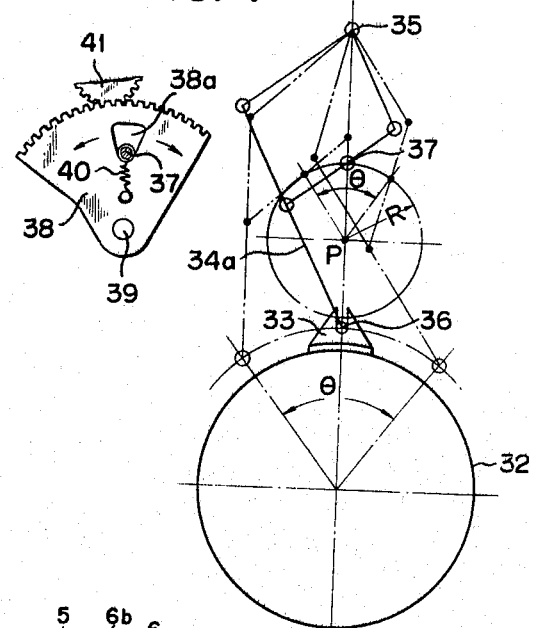

This invention relates to exposure measuring mechanisms of cameras.

It is desirous from a practical standpoint to set a shutter time and a film sensitivity value by using the same operating member.

It is therefore one object of the present invention to provide such setting mechanism in a focal plane camera where a photoelectric exposure meter is used, which comprises a setting ring having film sensitivity scale and arranged slidably and rotatably on a shutter time adjusting means or a member interlocking therewith, balls provided in the vicinity of the movable portion of said ring, and forming a clutch mechanism between the ring and the shutter time adjusting means, the clutch mechanism being engageable and disengageable in an axial direction.

This invention also provides an improvement of the connecting mechanism for introducing a signal in accordance with a stop member on the lens body into the calculating mechanism forming a part of an exposure meter circuit in the camera body, the camera being provided with interchangeable lenses.

Generally speaking, the stop setting of a lens is carried out in a circular movement with light axis as the center thereof, and therefore in order to connect the setting movement to the exposure calculating mechanism, a connecting member to transmit the rotational movement is provided for the calculating mechanism. However, in the case wherein a removable exposure meter is provided within a camera, as in the case of Nikon (trademark) Photomic or the like, the rotational movement of the lens stop ring is about the lens axis which is outside the lens body. The movement of the connecting member must be controlled by a cam groove; the translatory movement of the member opposing the rotational movement so that binding could occur which has been a drawback of the conventional system. Therefore, the manufacturing of said conventional mechanism is not easy, and the operation thereof has not been carried out smoothly.

It is therefore another object of the present invention to overcome said drawback by making the connecting mechanism to actuate in rotational movement with the provision of a collapsible pantagraph connecting the calculating mechanism to the stop ring member on the lens.

This invention further provides a maximum aperture ratio memory means in a single lens reflex type cameras in which the proper exposure of the object is determined by measuring the illumination of the light rays passing through the camera lens.

It is therefore the further object of the invention to provide a maximum aperture ratio memory means in which the maximum aperture ratio signal of the mounted interchangeable lens is memorized by the exposure calculating mechanism in the camera by actuating the stop operating member of said lens to set it at the maximum aperture value thereof.

Figure 6:
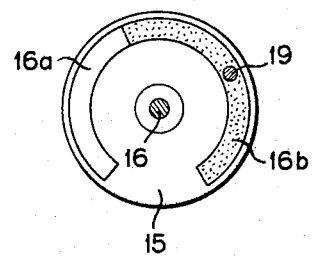
Figure 5:
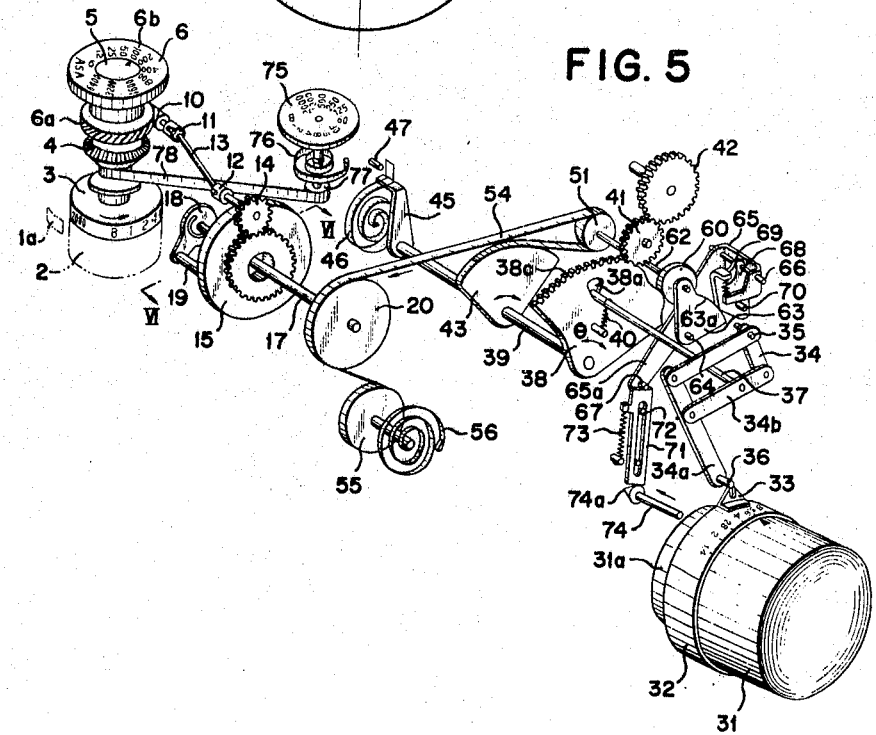
Figure 7:
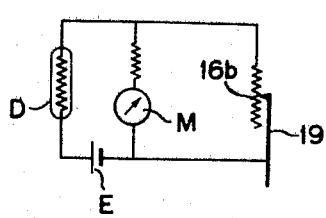
Figure 8:
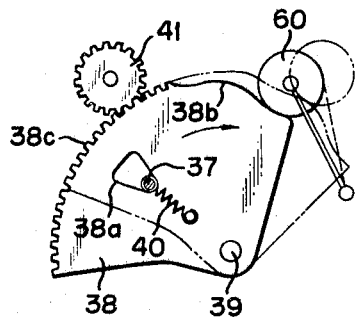
Figure 9:
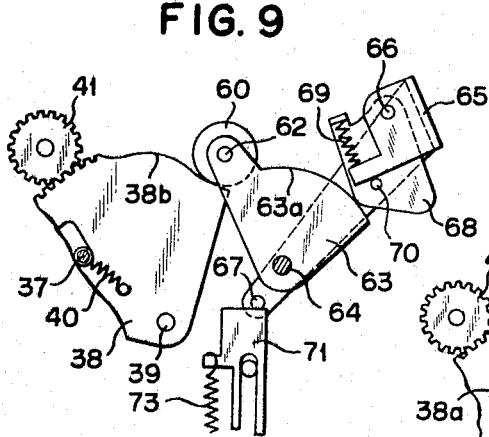
Figure 10:
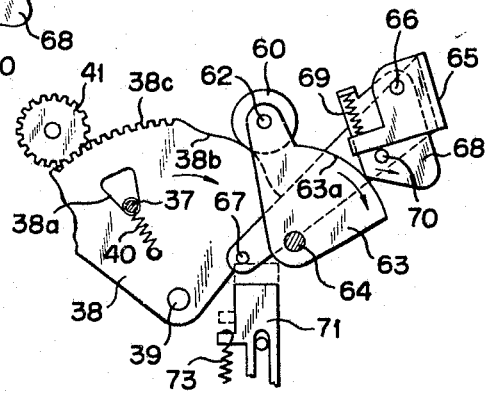
Figure 11:
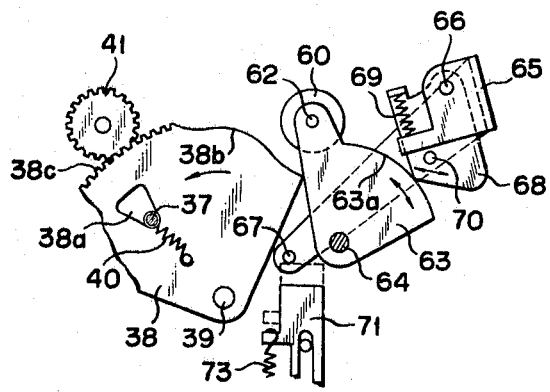

The present invention will now be more apparent from the following description referring to the embodiments shown in the accompanied drawing, in which:

FIGS. 1 and 2 show a setting mechanism of shutter time and film sensitivity or speed rating according to the present invention and FIG. 1 shows its external view and FIG. 2 shows its cross sectional view;

FIGS. 3 and 4 show an embodiment of the structure of the connecting mechanism for introducing a signal of the stop into the calculating mechanism of the present invention and FIG. 3 shows its main portion and FIG. 4 illustrates its function; and FIGS. 5 to 11 show an embodiment of the maximum aperture ratio memory means according to the present invention; FIG. 5 shows the main portion of the embodiment, FIG. 6 shows the section taken along VI—VI line of FIG. 5 and illustrates the exposure calculating board, FIG. 7 shows an example of an exposure calculating circuit to be used in the embodiment, FIG. 8 illustrates interlocking operation of the exposure calculating mechanism and the exposure value, and FIGS. 9 to 11 illustrate the operation for memorizing the maximum aperture ratio of the mounted interchangeable lens, FIG. 9 showing the status before the lens is mounted, FIG. 10 showing the status in which the lens has been mounted and the stop ring has been rotated to the position of the maximum aperture ratio and FIG. 11 showing the status in which the stop ring is reversely rotated from FIG. 10 to set it to an optional stop value.

In FIGS. 1 and 2, 1 is a camera having an indicator window 1a on the side surface thereof, 2 is a time setting means (not shown) of a focal plane shutter means built in a camera, and is composed of conventional means, 3 is a shutter time scale ring connected to said time setting means 2 by means of pins 3a and is rotatably fitted to the body 1. And 4 is a bevel gear which is devised so as to be rotated along with said shutter time scale ring 3, and the film sensitivity of speed rating indicator 5 is fixed on the end thereof, 6 is a setting ring with a helical gear 6a formed on the outer periphery thereof and on the upper surface thereof the film sensitivity scale 6b is formed. The setting ring 6 is rotatably and slidably mounted on the shaft portion 4a of the bevel gear 4 through balls 7, and it is so devised that a toothed conical clutch can be formed by having a reversal bevel gear 6c formed on the lower end geared against said bevel gear 4. When the clutch is engaged, it is possible to carry out the shutter time setting operation, and when the setting ring 6 is held in its upper position, it is possible to carry out the operation for setting film sensitivity. A ball receiving cylinder 8 is fitted to the internal periphery of the setting ring 6, 9 is a compressed spring, and 10 is a helical gear which meshes with the helical gear 6a, and the operation thereof is introduced to the conventional photoelectric exposure calculating means (not shown) through the universal joint 11. The object of using helical gear means 6a and 10 is to avoid unmeshing thereof during translatory movement of the film sensitivty setting ring 6. It is possible to make use of other transmitting mechanisms such as spur gear mechanism or the like which can perform the same function, or it is also possible to devise it so as to move two gears up and down in such a manner where said two gears are meshed against each other, and to lead the movement thereof to the exposure calculating mechanism by means of a flexible transmitting member such as flexible shaft or the like.

Since the structure is as mentioned above, when the setting ring 6 is rotated in the position illustrated in FIG. 2 the rotation thereof is interlocked to the time adjusting device (not shown) through the shutter time scale ring 3 since the toothed conical clutch composed of gearings 4 and 6c are engaged to each other. Therefore, in case the desirable time value is shown at the indicator window 1a, the signal thereof is transmitted to the exposure calculating mechanism (not shown) through the helical gears 6a and 10.

However, when the setting ring 6 is held up, the clutch 4, 6c are disconnected, and therefore the setting ring 6 can be rotated regardless of the shutter time scale ring 3. In this case the rotation resistance between the setting ring 6 and the shaft portion 4a of the bevel gear is small because of the balls 7, and the rotational resistance added by the bevel gear 4 and shutter time scale ring 3 and the resistance of spring 9. The predetermined film sensitivity is selected by turning the setting ring 6 in its upper position, the setting ring 6 alone being rotated, and a film sensitivity signal is transmitted to the exposure calculating mechanism. When the hand is removed, the clutch 4 and 6c are returned to the engaged state again, and at this time, the resistance caused by the spring 9 does not work on the body 1 and the scale ring 3 and in regard to the rotation resistance, only that of time adjusting means 2 is left out.

In regard to the clutch means, it is not restricted only to the toothed conical clutch, but other types of clutch means can be employed, but when the toothed clutch means should be employed as in the present embodiment, it is a matter of course that the pitch thereof should be made agreeable with the film sensitivity scale.

The inventive structure can be widely applied not only to cameras of the exposure meter built-in type, but can also be used for exposure meters attached onto a camera. In the latter case, it is convenient if a removable connecting means should be used for connecting the shutter time scale ring 3 and the time adjusting means 2. As described so far, when the inventive structure is employed, it is possible to carry out the operation for setting the shutter time and film sensitivity with the same member, and therefore it is very convenient from the practical point of view.

Next, in FIGS. 3 and 4, there is shown an embodiment of the structure of the connecting mechanism for introducing a signal of the stop into the exposure calculating mechanism of an interchangeable lens type camera having a photoelectric exposure mechanism provided in the camera body.

In FIGS. 3 and 4, 31 is an interchangeable lens mounted on the side of the camera by conventional means such as a bayonet or the like and 32 is the stop ring thereof, and 33 is a fork formed stop signal member fixed on said stop ring 32, and the position thereof is determined where it is common to various kinds of interchangeable lenses (for example at F/5.6); 34 is a collapsible pantagraph composed of four pieces forming a parallelogram and one end thereof is supported movably by the shaft 35 provided on the fixed portion on the side of a camera, and the movement of said pantagraph is controlled so as to make a circular movement by means of the abutment of the interlocking plate 38 and the connecting rod 37 described hereinafter; 36 is a connecting pin fixed on a long arm 34a of said pantagraph 34, and said connecting pin 36 is devised so as to be fitted to the fork portion of said signal member 33 at the time when an interchangeable lens 31 is mounted; the connecting rod 37 is provided on one side 34b of said pantagraph 34, and 38 is an interlocking plate having a toothed wheel on the outer periphery thereof and is fixed on one end of the shaft 39. Said connecting rod 37 is fitted to the sector form groove 38a which is formed almost in the center thereof as is shown in the drawing, and it is so devised that the rod 37 and the groove 38a are always abutted against each other by means of a spring 40; 41 is an intermediate toothed wheel, and 42 is a stop value indicator plate, and it is so devised that it can be observed in the finder or from outside of a camera by conventional means; 43 is a sector form plate fixed in the center of the shaft 39, and one end of ribbon 44 is fixed on the peripheral portion. The ribbon 44 is interlocked to the conventional exposure calculating mechanism (not shown) in a camera, and it is for introducing the stop signal of the lens to said mechanism (represented by rotation angle $\theta$); 45 is an L shaped member fixed on the other end of the shaft 39, and 46 is a coil spring, one end thereof abutting the member 45, and biasing the shaft 39 in a counterclockwise direction.

According to the above mentioned structure, when an interchangeable lens 31 is mounted on the camera, and when the stop ring 32 is rotated after stop signal member 33 and the connecting pin 36 are fitted, the pantagraph 34 also makes a circular movement along with the same as shown in FIG. 4, so that the connecting rod 37 moves in a circle having a radius R. Thus the center of rotation (shaft 39) of the interlocking plate 38, and the center of rotation (P) of the connecting rod 37 are placed on the same axis, the rotation $\theta$ of the stop ring 32 is reduced and is smoothly transmitted to the interlocking plate 38.

When the interchangeable lens 31 is mounted on the camera, it is possible that after the lens is mounted the connecting pin 36 and the signal member 33 are fitted, or on the other hand it is possible that pin 36 is automatically fitted by going up an inclined side surface of the signal member 33 at the time of the rotating operation for mounting the lens. In either case it is necessary to displace the pantagraph 34 up and down at the time when the fitting operation is carried out, and therefore it is necessary to make such a device that the contact of the connecting rod 37 and the interlocking plate 38 can be moved up and down. However, in the case of the type wherein the connecting pin 36 escapes when the lens is mounted it is not necessary to have such a device, and it is needless to mention here that they can be just abutting. Means for providing a collapsing force to said pantagraph 44 is not restricted to the type of the embodiment given in the drawing.

It is a matter of course that the present inventive device can be applied to either of the type wherein an exposure meter is built in a camera or the type wherein an exposure meter is attached onto a camera. And as above mentioned, the interlocking mechanism is wholly operated in the form of the rotational movement, and therefore when compared with the conventional systems, the operation of the system of the present invention is smooth and correct, and the manufacturing thereof is easy. In addition to the above mentioned advantage, the interlocking operation can be attained either from the stop ring or from the calculating mechanism, and therefore it is very convenient.

Now the explanation will be made of the embodiment of the present invention shown in FIGS. 5 to 11, in which the maximum aperture ratio signal memory means for an interchangeable lens for cameras having exposure measuring means of the type where the proper exposure of the object is determined by measuring the illumination of the light rays passing through the camera lens.

Generally speaking when an exposure measuring means is built into a camera provided with interchangeable lenses, the calculating mechanism provided in the camera and the stop setting of the lens must be interlocked, but there are various kinds of restrictions insofar as the connection of said calculating mechanism and the stop ring setting. In other words, in view of the relation between interchangeable lenses, the stop angle required for stopping from a certain stop value to another stop value must be common to the respective lenses, and in the relation of the respective lenses and exposure calculating mechanism, the respective stop values indicated by the calculating mechanism and the stop values of the respective lenses must correctly correspond when the lens is mounted on a camera. In addition to that when the respective lenses are mounted on a camera, the interlocking member of the calculating mechanism and the stop signal member on the lens must be perfectly interlocked. The stop value indicated by the calculating mechanism at the mounted position, and the stop value of the lens must agree, and therefore generally the position of the stop signal member is on a certain position common to the respective lenses such as $F/5.6$. This becomes a big problem when TTL system exposure meter is used as it is also a problem in the case of a single lens reflex camera. The reason for this is that an automatic preset mechanism is started to be adopted for the stopping mechanism of an exchange lens. In other words, in the case of an automtaic preset diaphragm, the diaphragm becomes maximum at the time of photometry, and therefore at the light receiving portion of the exposure meter, the light rays correspond to the maximum aperture ratio of the lens mounted on a camera. And consequently, when the maximum aperture ratio of the various kinds of interchangeable lenses are the same, there is no problem, but when there is a difference in the aperture ratio of the respective lenses, the amount of incoming light rays is different even if the illumination of the same object is measured, so that the obtained values becomes variable. For example, between the value obtained by measuring the illumination of a certain object by using a lens whose aperture ratio is $F:2$ and the value obtained by measuring the illumination of the same object by mounting a lens whose aperture ratio is $F:1.4$ or $F:2.8$, a difference corresponding to one stop is observed.

Therefore, in accordance with the conventional devices, focusing alone was carried out at the time when the diaphragm is opened, and then an exposure measured by stopping the lens aperture up to the value employable for photographing, an inconvenience which is a drawback of the conventional devices.

The present invention removes the drawbacks of the conventional devices, and is characterized in that it is possible to make photometry in an open state even when lenses of any aperture ratio should be mounted.

In FIG. 5, members designated by reference numerals 1 through 11 are the same as shown in FIGS. 1 and 2. In other words, the clutch means as exemplified in FIGS. 1 and 2 is employed in this embodiment a detailed explanation of these elements being omitted here.

In FIG. 5, 11 and 12 are universal joints, and 13 is a transmission shaft, and 14 is a transmission gear which is rotated along with said universal joint, and meshes with a gear formed on a rotatably mounted calculating disc 15 of insulating material. On the reverse side of the disc 15, as illustrated in FIG. 6, is a calculating resistor element in arcuate form comprising a conductive strip 16a electrically connected to resistance 16b. A calculator shaft 17 rotatably supported and passing through a central opening provided in disc 15, has secured thereto at the back end, a brush carrier 18 of insulating material. A brush contact 19 of resilient material is fixed to the carrier and is adapted to engage the arcuate resistor element on disc 15. With reference to FIG. 7, the resistor element and brush form a part of a conventional calculating circuit in cooperation with the photoconductor D, battery E, and the galvanometer M. Fixed on the other end of the shaft 17, is a pulley or disc 20 rotated by means of the ribbon 54 which is described hereinafter. An interchangeable lens 31 is mounted on the camera by conventional means such as bayonet or the like, and 32 is the stop ring therefor, and 33 is the fork from stop signal member fixed on said stop ring 32, and the position of said stop signal member can be determined at a place common to various kinds of exchange lenses (such as $F/5.6$). A pantograph 34 is rotatably mounted on a shaft 35 fixed within the camera and connected by a coupling pin 36 provided in the long arm 34a to the forked signal member 33 provided on the stop ring 32 of the interchangeable lens 31. A connecting rod 37 is provided on arm 34b of the pantograph 34, its position being determined by a line interconnecting the shaft 35 and the connecting pin 36. An interlocking plate 38 formed with a V-shaped opening 38a, a cam portion 38b and a gear sector 38c is fixed on one end of the shaft 39, and as is shown in the diagram the connecting rod 37 is fitted to the V-shaped groove 38a which is formed almost in the center thereof, and it is so devised that said connecting rod and said groove are always engaged by means of a spring 40. Therefore when the stop ring 32 is rotated by fitting the connecting pin 36 to the stop signal member 33, as is shown in FIG. 4, the connecting pin 36 and the connecting rod 37 make a circular movement at the same time, and in this case the rotational center P of said connecting rod 37 and the rotation center (shaft 39) of the interlocking plate 38 must be placed on the same axis. An intermediate gear 41 meshing with gear sector 38c, meshes with a gear 42 which rotates a stop value indicator plate (not shown) which may be viewed within a finder or from outside of a camera along with the shutter time value indicator plate 75 described hereinafter. A sector formed plate 43 fixed in the central portion of said shaft 39, and one end of a ribbon 54 is secured to the peripheral portion thereof. Said ribbon 54 passes over the pulley 20 after passing around a maximum aperture ratio roller 51, to be described hereinafter, and secured at its other end to a pulley or disc 55. The pulley 55 is biased clockwise by a coil spring 56 to move the ribbon from right to left as indicated by the arrow. An L-shaped lever 45 is secured to the end of the shaft 39, the free end of the lever being abutted by the free end of a coil spring 46 which biases the shaft 39 in a counterclockwise direction. A stop 47 is provided for the spring 46 for retaining the connecting pin 36 in a predetermined angular position (such as $F/5.6$) when the lens 31 is removed or when a lens having no stop signal member 33 is mounted. In regard to the relation between said two coil springs 46 and 56 the former is stronger than the latter (almost twice as strong when the resistance in the right and left directions is balanced). A maximum aperture ratio memory camming roller 60, which rides on the cam portion 38c and the ratio adjusting roller 51 previously mentioned, which acts as a dancer roller for the ribbon 54, are secured on a shaft 62 rotatably mounted in a substantially sector-shaped memory member 63. The member 63 is pivotally supported on a fixed shaft 64 and is formed with an arcuate peripheral portion 63a. A U-shaped member 65 is pivotally supported on a shaft 66 secured in the camera and passing through the arms of the member, one of the arms 65a being longer than the other and provided with a pin 67 secured adjacent its end.

A control member 68 is pivoted between the arms of the U-shaped member on the shaft 66 and engages the arcuate portion 63a of the memory member 63. The control member 68 is interlocked with the U-shaped member 65 by means of a spring 69 interconnecting an extending ear on the control member and a pin 70 held in engagement against the lower edge of the shorter arm of member 65. The initial point of engagement of the control member 68 and the arcuate portion 63a of the memory member 63 is devised to be on a radial line from the center of shaft 64, this radial line being angular disposed in relation to a line drawn between the centers of the shafts 64 and 66. An interlocking plate 71 is abutted by pin 67 and is movably mounted by means of the pins 72, and is always pressed downwards by means of the spring 73, and 74 is a push button member having a conical portion 74a at the end thereof, and it is so devised that it is pushed in the direction as is shown by an arrow by a predetermined amount by means of the rear end portion 31a of the lens mount at the time when the lens 31 is mounted.

A shutter speed dial 75 is provided on the camera and is biased counterclockwise by a coil spring 76, a pulley 77 integral with the dial 75 being connected to a drum portion of said bevel gear 4 through the short ribbon 78. Thus, the device of embodiment has a structure as mentioned above, that when an interchangeable lens 31 is mounted and after fitting the stop signal member 33 and the connecting pin 36, the stop ring 32 is rotated, to operate the pantograph 34, the connecting rod 37 moves to the right and left on the periphery of a circle whose radius is R, and the signal θ of the stop ring 32 is transmitted to the interlocking plate 38. The signal θ is introduced to the brush 19 through the shaft 39, the sector formed plate 38, the ribbon 54, the intermediate pulley 20, the calculating shaft 17 and the plate 18, the angular position thereof being changed to change the resistance value of the resistor element in accordance with the signal θ.

The clutch connecting the setting ring 6 and the bevel gear 4 is released by holding up the setting ring 6 (in this case the setting ring 6 alone is rotated because some rotation resistance is added to the bevel gear 4 by means of the friction between the bevel gear and the camera body 1 due to the resistance of the spring 9 or the time adjusting means 2) the sensitivity of the film to be used is set on the indicator 5 (for example ASA 100). After returning the setting ring to the original state (i.e., the state where the clutch is being engaged), the setting ring 6 is again rotated and shutter time is set to be a predetermined value. The respective signals of the film sensitivity and the shutter time are transmitted to the gear 14 through the helical gears 6a and 10 and the universal transmitting means 11 and 12 to rotate the calculating disc 15. The angular position of the resistor element is changed relative to the contact 19 in accordance with the amount of these signals to calculate the proper exposure. However, as aforementioned in TTL type single lens reflex type camera, these are not sufficient in order to measure the open exposure. In other words, it is necessary to carry out the correction of the maximum aperture ratio specific to the interchangeable lens used. In accordance with the present invention, at the time when an interchangeable lens is mounted, the problem is solved in such a manner that the stop ring is once turned up to the position of the maximum aperture ratio, and the maximum value signal is memorized on the calculator means.

The following is an explanation of these operations. The stopping ring 32 is turned to adjust the same to the maximum value of the mounted lens (such as F/1.4), and the rotating operation thereof is transmitted to the interlocking plate 38 through the pantograph 34, and the connecting rod 37 and therefore as is shown in FIG. 8, the cam portion 38b of said interlocking plate 38 pushes the memory roller 60 to rotate said memory member 63 as much as the maximum value signal amount in the clockwise direction and said rotation is introduced to the brush 19 through the adjusting roller 51 and the ribbon 54 and thereby the correction of the maximum apperture ratio can be carried out. In addition to that, the cam portion 38b is to change the given maximum value signal into a value for exposure calculation, and the form of the cam can be calculated by conventional means.

When an interchangeable lens 31 is mounted (refer to FIGS. 10 and FIG. 11), the rear end 31a pushes the button member 74 in the direction as is shown by the arrow and the conical portion 74a lifts the interlocking plate 71. The L-shaped member 65 is rotated in the clockwise direction with the shaft 66 as the fulcrum and pushes the control member 68 onto the arc portion 63a of the memory member 63 through the compressed spring 69. In this case the contact point of the two is on the right side of the line connecting the shafts 64 and 66, and therefore the rotation of the memory member 63 in the clockwise direction is possible.

When the stop ring 32 is rotated in the counterclockwise direction, and then turned to any optional stopping value (refer to FIG. 11), a self locking effect taken place between the memory member 63 and the control member 68 because of the positions of the respective shafts 64 and 66 and the contact points, and the return of said memory board 63 is prevented even when the stop ring 32 is optionally rotated, the memorized maximum value signal remains as it is, and the correction of the maximum aperture ratio is continuously carried out in the exposure adjustment which is subsequently made.

Next, when the lens 31 is removed from the camera, the push button member 74 is returned to the original position and the interlocking member 71 is lowered. The U-shaped member 65 is also returned to the original position, but at this time the control member 68 is also returned to the original position through the pin 70. The memory member 63 is rotated in the counterclockwise direaction as it is released of the control thereof, and engages the interlocking member 38 through the roller 60. Therefore when other interchangeable lens is mounted, it is possible to have the same memorize the maximum aperture ratio in accordance with the above mentioned process.

In addition to this, when an interchangeable lens 31 is mounted on a camera, the connecting pin 36 and the signal member 33 can be connected, and also it is possible to make such a contrivance that the pin 36 is automatically fitted by going up a sliding surface of the signal member 33 at the time when the rotating operation is carried out in order to mount the lens. At any rate, at the time when the fitting operation is carried out, it is necessary to displace the pantograph 34 up and down, and therefore the contact between the connection rod 37 and the interlocking plate 38 should be contrived so as to have said contact movable in up and down direction.

It is a matter of course that the present invention can be employed for either a camera of the type wherein the exposure meter is built into a camera or the type wherein the exposure meter is attached on a camera.

When memorized setting is wished to be removed, it is needless to mention here that, without being restricted to the present embodiment of this invention, a specific memory removing means can be provided and thereby the removal of memorized setting can be separately carried out.

As mentioned so far, when the present invention is applied, it is very convenient because the maximum aperture ratio specific to the respective lenses can be automatically corrected only by rotating the stop ring of the mounted lens. In accordance with the present invention an advantage is obtained in that a correct exposurement may be made by using an optional interchangeable lens. When a stop value indicating dial is provided operated by the gear 42, the stop value setting can be observed directly or in the viewfinder. When a lens having no stop signal member 33 is mounted on the camera, the position of the connecting pin 36 remains in a predetermined position as set by the stop 47, it is nevertheless possible to make correct exposure calculations for any aperture ratio since a constant value, as for example, F/5.6, is preset in the calculating mechanism described and any change in the stop aperture ratio will be introduced in the calculating means as a change in the amount of incoming light rays,

What is claimed is:
1. In a focal plane camera having means for setting a shutter time and a film sensitivity value, the combination comprising:
a shutter time adjusting mechanism,
a member interlocked with said mechanism,
a setting ring provided with a film sensitivity scale axially slidable and rotatably mounted on said member,
an index on said member cooperating with said scale, and
a clutch mechanism formed by balls interposed between said ring and said member permitting rotation of said member by said setting ring in one axial position of the ring and rotation of said setting ring alone in another axial position of said ring.

2. In a camera provided with interchangeable lenses, the combination comprising
a photoelectric exposure mechanism on the camera body including an exposure calculating mechanism,
a stop signal member provided on the stop ring of an interchangeable lens mounted on the camera body, and
means interconnecting the stop signal member and the exposure calculating mechanism including a collapsible pantagraph.

3. The combination as set forth in claim 2, wherein an interlocking member forms a part of the interconnecting means, a shaft rotatably supporting the interlocking member, and a connecting rod fixed in an arm of the pantagraph and cooperating with the interlocking member, the rotation of the lens stop ring moving the connecting rod in the arc of a circle having its center on the same axis as the shaft.

4. In a single reflex camera provided with interchangeable lenses and an exposure meter circuit for measuring the intensity of light passing through the lens mounted on the camera body, the combination comprising
a stop signal member on the stop ring of the lens mounted on the camera body,
an exposure calculating mechanism in the camera body,
a shutter speed setting mechanism provided for the camera and connected with the exposure calculating mechanism,
interlocking means provided between the exposure calculating mechanism and the stop signal member,
a member movable in response to the adjustment of the lens stop ring,
maximum aperture ratio signal memory means including means for engaging the movable member and movable in accordance therewith, control means for retaining the engaging means at its maximum position of movement, and correcting means connected to the engaging means and calculating mechanism, said connecting means being movable with the engaging means for setting into the calculating mechanism the maximum aperture ratio of the lens mounted on the camera upon movement of the movable member by the stop ring to the maximum aperture ratio of the mounted lens.

5. An exposure measuring mechanism according to claim 4, wherein the means interconnecting the stop signal member and the interlocking member is a pantagraph.

6. The combination according to claim 4, wherein a releasing means is connected to the control means and engaged by the mounted lens, the releasing means releasing the stop operation of the control means upon removal of the lens to erase the setting of maximum aperture ratio from the calculating mechanism.

7. An exposure measuring mechanism according to claim 6, wherein the point of engagement of the control member abutting surface on the second camming surface is on a radial line drawn to the center of the first shaft which is angularly disposed with respect to a second radial line drawn between the centers of the first and second shafts.

8. An exposure measuring mechanism according to claim 7, wherein a connecting rod interconnects the pantagraph and the interlocking member, the movement of the connecting rod by the rotation of the stop ring being in the arc of a circle, the center of which is on the same axis as that of the first shaft.

9. An exposure measuring mechanism for a single lens reflex camera having interchangeable lenses and an exposure meter circuit including a variable resistor, the resistance value of which is varied by shutter speed and film sensitivity settings and aperture ratio settings, the combination comprising
a stop signal member on the stop ring of the lens,
an interlocking member pivoted on a first shaft in the camera,
means interconnecting the stop signal member and the interlocking member to position said member in accordance with the stop ring setting,
a cam surface on said interlocking member,
a pivoted lever member,
a control member pivoted with said lever member, said control member having an abutting surface,
resilient means interconnecting the pivoted lever and the control member,
a memory member pivotally mounted on a second shaft in the camera,
a second camming surface on the memory member engaged by the abutting surface of the control member,
a shaft carried by the memory member,
a memory roller on the memory member shaft riding on the cam surface of the interlocking member for angularly positioning the memory member,
a ribbon movable in accordance with the movement of the interlocking member by the stop signal member for varying the value of the variable resistor,
a dancer roller on the memory member shaft over which the ribbon passes to shorten and lengthen the ribbon in accordance with the angular positioning of the memory member by the memory roller, rotation of the stop ring of a lens to its maximum aperture ratio angularly positioning the dancer roller to provide a resistance value correction for the maximum aperture ratio.

References Cited

UNITED STATES PATENTS

| | | |
|---|---|---|
| 2,879,702 | 3/1959 | Gossen et al. |
| 3,037,436 | 6/1962 | Broschke. |
| 3,040,639 | 6/1962 | Ohashi. |
| 3,072,029 | 1/1963 | Leitz. |
| 3,078,772 | 2/1963 | Goshima. |
| 3,087,395 | 4/1963 | Akahane. |
| 3,183,807 | 5/1965 | Steisslinger. |
| 3,262,380 | 7/1966 | Winkler. |

NORTON ANSHER, Primary Examiner

J. F. PETERS, Jr., Assistant Examiner

U.S. Cl. XR.

95—11, 64